July 13, 1965 T. F. ANGQUIST 3,193,897
WIRE GRIP
Filed April 9, 1963
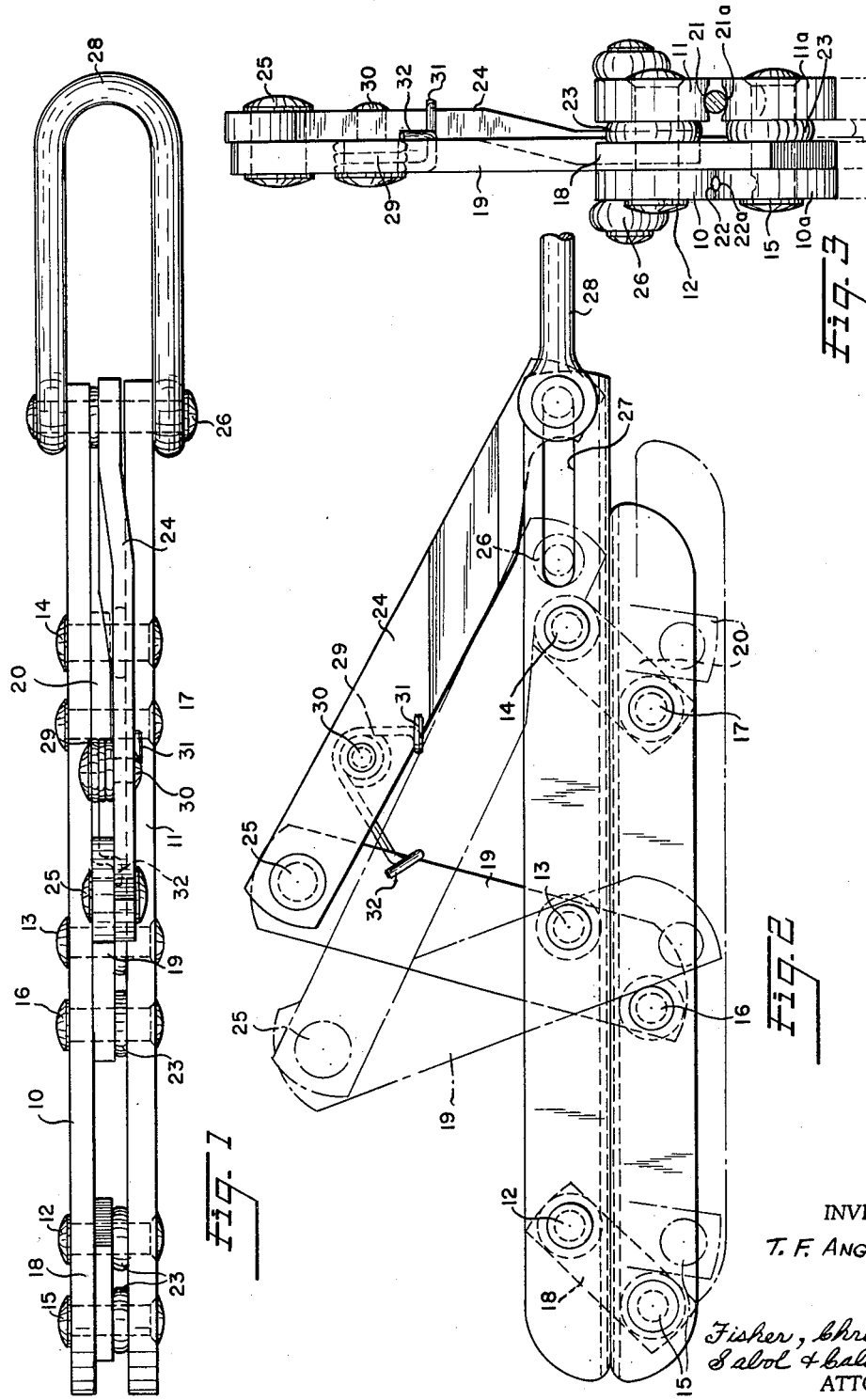
INVENTOR
T. F. ANGQUIST
Fisher, Christen,
Sabol & Caldwell
ATTORNEYS

United States Patent Office 3,193,897
Patented July 13, 1965

3,193,897
WIRE GRIP
Torsten Fredric Angquist, Jamestown, N.Y., assignor to Crescent Niagara Corporation, Buffalo, N.Y., a corporation of New York
Filed Apr. 9, 1963, Ser. No. 271,747
2 Claims. (Cl. 24—134)

This invention relates to a hand tool and more specifically to a wire gripper for handling wire, cable or the like.

Preferably, the invention relates to a wire gripper for installing electrical conductors; however, it is to be understood that the invention can be used for any wire, cable, rope, strand, or the like.

Wire or cable grippers in present use are not suitable for use with wire, cable or the like, especially that having an insulation covering. One reason why the present grippers are not suitable is that they have short gripping jaws which tend to pinch the insulation covering or the strand itself.

Also, with the wire or cable grippers presently available, it is difficult to accommodate wires or cables of various sizes with the same gripper. Therefore, it is an object of this invention to provide a wire or cable gripper which can readily accommodate wires or cables of various sizes.

A further object of this invention is to provide a wire and cable gripper having jaws of extended length for gripping wire or cable over a larger area, thereby minimizing the chance of damaging the insulation covering of such wire and cable and the wire or cable itself.

This objective is accomplished by providing a wire or cable gripper having a plurality of pairs of jaws operated by a common linkage and leverage system. Any pair of jaws can be used selectively according to the size of wire, cable or the like to be gripped or handled by the device.

It is a further object of the invention to provide a device which is easily and inexpensively manufactured.

In the drawings:

FIGURE 1 is a top view of a preferred form of wire gripper constructed in accordance with the teaching of this invention;

FIGURE 2 is a side view of the device in FIGURE 1; and

FIGURE 3 is an end view of the device shown in FIGURE 1, as viewed from the left end of the device as shown in FIGURE 1.

Referring to the drawings where like numerals indicate like parts, the wire or cable gripper has two pairs of jaws 10, 10a and 11, 11a. The jaws are preferably of an extended length as shown for purposes to be hereinafter set forth.

Jaws 10 and 11, to be referred to as the upper jaws, are connected to each other in spaced parallel relationship by studs 12, 13 and 14. Jaws 10a and 11a, to be referred to as the lower jaws, are also connected to each other in spaced parallel relationship by studs 15, 16 and 17.

Links 18 and 20 are disposed between the jaws 10 and 11 and between the jaws 10a and 11a. Link 18 is pivotally connected at one end to stud 12 which connects the upper jaws 10 and 11 and is pivotally connected at the other end to stud 15 which connects the lower jaws 10a and 11a. Similarly, link 20 is pivotally connected at one end to stud 14 which also connects the upper jaws 10 and 11 and is pivotally connected at the other end to stud 17 which also connects the lower jaws 10a and 11a. The links 18 and 20 therefore connect the upper jaws to the lower jaws for relative movement with respect to each other and vice versa.

The links 18 and 20 are of such a length that if the jaws were moved so that the longitudinal axis of each link would be perpendicular to the longitudinal axis of the jaws, the lower jaws would be out of contact with and spaced directly below the upper jaws.

When the lower jaws 10a and 11a are moved upwardly and to the left toward the upper jaws, links 18 and 20 pivot about their respective studs 12, 15 and 14, 17, so that when the lower jaws come in contact with the upper jaws, the longitudinal axes of links 18 and 20 will be at angles to the longitudinal axes of the jaws.

Jaw 10 and jaw 10a form one pair of cooperating jaws and jaw 11 and jaw 11a form another pair of cooperating jaws. The jaw faces of the respective jaws are indicated by numerals 21, 21a and 22, 22a.

It can be seen in FIGURE 3 that jaws 11 and 11a and jaw faces 21 and 21a define an opening larger than that defined by the jaws 10 and 10a and respective jaw faces 22 and 22a.

Washers 23 are positioned on each stud between the respective link and jaw for spacing purposes and friction-reducing purposes.

The actuating elements for the pairs of jaws include lever 19 which is pivotally connected at one end to the centrally positioned stud 16 which connects the lower jaws 10a and 11a to each other, and is pivotally connected at its other end to one end of arm 24 by means of stud 25. The lever 19 is also pivotally connected intermediately to centrally positioned stud 13 which connects the upper jaws 10 and 11.

It is to be noted that while the axes of the pivotal connections or studs 13 and 16 are located on a line parallel with a line passing through the axes of studs 12 and 15, and a line through 14 and 17, link or lever 19 is disposed angularly to links 18 and 20, whereby link or lever 19 assumes substantially a right angle with respect to the jaws when the jaws are in the closed position while the links 18 and 20 assume a lesser angle with respect to said jaws.

The arm 24 is pivotally connected at its other end to pin 26 which is slidably positioned in the longitudinally extending slotted openings 27 in jaws 10 and 11.

The clevis or draft bar 28 is pivotally connected at its free ends to the outer extremities of stud 26 which extend beyond the side walls of the upper jaws 10 and 11. The clevis serves as a means to which one end of a rope or the like, not shown, can be attached with the other end being attached to suitable means, not shown, for applying a pulling force.

Arm 24 has thereon the stud 30 located at a point adjacent the stud 25 which connects arm 24 and lever 19.

Coil spring 29 is mounted on stud 30 and has arms extending tangentially therefrom, with the free ends of said arms forming hooks 31 and 32 which engage arm 24 and lever 19 respectively.

The arms of the spring 29 are biased away from each other and tend to push apart the arm 24 and the lever 19 causing the jaws to move toward engagement with each other as indicated by the solid lines in FIGURES 2 and 3.

In operation, the wire or cable gripper is opened by gripping the lower jaws with one hand and pushing the clevis 28 inwardly or toward the left in the drawing against the pressure of the spring 29. The wire or cable gripper, when open, assumes the position indicated by the broken lines in FIGURES 2 and 3.

Then, according to the size wire, cable, strand, or the like that is to be accommodated, jaw pair 10 and 10a or 11 and 11a is selected. Assuming that jaws 11 and 11a are to be used, the wire, cable, or the like is placed between the jaws as shown in FIGURE 3. The jaws and clevis are then released and the jaws will close about the wire, cable or the like by pressure of the spring 29 on the arm 24 and lever 19. Pulling force is then applied to the clevis 28 in a direction away from the device or to the right of the device shown in FIGURE 1, causing more pressure to be applied to close the jaws in addition to the pressure of spring 29. The pull on clevis 28 causes the clevis 28 and stud 26 in openings 27 to move rearwardly. The arm 24 which is attached to stud 26 accordingly moves rearwardly, pulling on link-lever 19. The link-lever 19, in effect, pivots about stud 13 in jaws 10 and 11, and because of its connection to jaws 10a and 11a through stud 16 causes the jaws 10a and 11a, supported additionally by links 18 and 20, to move as a unit upward and to the left toward engagement with the upper jaws. The greater the pull, the greater the pressure or gripping action on the wire, cable or the like between the upper and lower jaws.

The wire, cable or the like is inserted over the full length of the jaws. The extended length of the jaws affords greater gripping power and minimizes chances of pinching or otherwise damaging the wire, cable or the like. A shorter jaw tends to pinch the strand.

In a general manner, while I have, in the above description, disclosed what I deem to be practical and efficient embodiments of my invention, it should be well understood that I do not wish to be limited thereto, as there might be changes made in the arrangement, disposition and form of the parts without departing from the principle of the present invention as comprehended within the scope of the accompanying claims.

I claim:
1. In a wire grip, the combination including first and second cooperating elongated jaw members arranged in parallel side by side relationship, first and second links spaced from each other and disposed angularly with respect to said jaw members, each of said links having a pivotal connection with each of the respective jaw members, whereby the opposing edges of said jaw members may be moved toward and away from each other in parallel translatory movement, said opposing edges each being longitudinally recessed to grip a length of wire, the axes of the pivotal connections of said first link being disposed on a line which is coincidental with a line extending centrally and longitudinally of said first link and which is parallel with a line passing through the axes of the pivotal connections of said second link, said line passing through the axes of the pivotal connections of said second link being angularly disposed with respect to a line extending centrally and longitudinally of said second link, said second link being disposed at a greater angle than said first link with respect to said jaws when said jaws are in the closed position, one end of said second link having an elongated portion extending substantially outwardly from one of the jaw members to provide an actuating lever, a third link having one end pivotally connected with the outer end of said actuating lever, the other end of the third link being slidably and pivotally connected with one of the jaw members and having means for connection with a pulling force.

2. The invention as defined in claim 1, wherein said first and second jaw members are disposed on one side of said first and second links, and third and fourth elongated jaw members are pivotally connected with said links and disposed in side by side relationship on the other side thereof parallel respectively with said first and second jaw members, the opposing edges of said third and fourth jaw members each being longitudinally recessed, the diameter of the longitudinal recesses of said third and fourth jaw members being of a different size than the longitudinal recesses of said first and second jaw members, whereby said first and second jaw members are adapted to receive a length of wire of a different diameter than that to be received by said third and fourth jaw members.

References Cited by the Examiner
UNITED STATES PATENTS

| | | | |
|---|---|---|---|
| 408,997 | 8/89 | Taft | 24—134 |
| 733,855 | 7/03 | Lague | 24—134 |
| 843,921 | 2/07 | White. | |
| 1,244,136 | 10/17 | Segerdahl. | |
| 1,464,939 | 8/23 | Kearney. | |
| 1,466,426 | 8/23 | Dicke | 24—134 |
| 2,087,649 | 7/37 | Magee. | |

DONLEY J. STOCKING, *Primary Examiner.*
BOBBY R. GAY, *Examiner.*